(12) United States Patent
Katsuda et al.

(10) Patent No.: US 8,582,015 B2
(45) Date of Patent: Nov. 12, 2013

(54) IMAGE PICKUP APPARATUS

(75) Inventors: Yasutoshi Katsuda, Kanagawa (JP); Yasuo Maeda, Osaka (JP)

(73) Assignee: Sony Corporation, Tokyo (JP)

( * ) Notice: Subject to any disclaimer, the term of this patent is extended or adjusted under 35 U.S.C. 154(b) by 389 days.

(21) Appl. No.: 12/801,261

(22) Filed: Jun. 1, 2010

(65) Prior Publication Data

US 2011/0001866 A1  Jan. 6, 2011

(30) Foreign Application Priority Data

Jul. 1, 2009  (JP) .................................. 2009-156792

(51) Int. Cl.
*H04N 5/225* (2006.01)
(52) U.S. Cl.
USPC .......................................... 348/342; 348/335
(58) Field of Classification Search
USPC ........................................................ 348/342
See application file for complete search history.

(56) References Cited

U.S. PATENT DOCUMENTS

| | | | | |
|---|---|---|---|---|
| 5,834,761 A | * | 11/1998 | Okada et al. | 250/208.1 |
| 5,845,035 A | * | 12/1998 | Wimberger-Friedl | 385/129 |
| 7,872,684 B2 | * | 1/2011 | Nakano et al. | 348/345 |
| 2005/0099562 A1 | * | 5/2005 | Nishikouji et al. | 349/117 |
| 2005/0253933 A1 | * | 11/2005 | Otake et al. | 348/211.99 |
| 2006/0039068 A1 | * | 2/2006 | Tokita et al. | 359/483 |
| 2008/0151735 A1 | * | 6/2008 | Seo et al. | 369/110.01 |
| 2010/0128164 A1 | * | 5/2010 | Petljanski et al. | 348/360 |

FOREIGN PATENT DOCUMENTS

JP  2004-219439  5/2004

* cited by examiner

*Primary Examiner* — Anthony J Daniels
(74) *Attorney, Agent, or Firm* — Rader, Fishman & Grauer PLLC

(57) ABSTRACT

An image pickup apparatus including: an image pickup device for receiving subject light passed through a photographing optical system by an image pickup surface in which a pixel arrangement is formed, and generating an image signal; and an optically transparent film having an optical anisotropy, and disposed in front of the image pickup surface, the subject light entering the optically transparent film; wherein a width of separation between a first ray of light and a second ray of light produced by birefringence in the optically transparent film is ½ or more of a pixel pitch in the pixel arrangement.

19 Claims, 9 Drawing Sheets

IMAGE PICKUP APPARATUS

BACKGROUND OF THE INVENTION

1. Field of the Invention

The present invention relates to an image pickup apparatus including an image pickup device that receives subject light passed through a photographing optical system and which generates an image signal.

2. Description of the Related Art

Among image pickup apparatuses such as digital cameras and the like, an image pickup apparatus has been proposed in which a fixed type half mirror (semitransparent mirror) is provided on an optical path of subject light passed through a photographing lens, light transmitted by the half mirror is received by an image pickup device, and reflected light is made incident on an AF sensor to enable constant focus detection for a subject.

An image pickup apparatus disclosed in Japanese Patent Laid-Open No. 2004-219439 (hereinafter referred to as Patent Document 1), for example, has an optical low-pass filter (OLPF) made of a rock crystal as a birefringent plate which OLPF is attached to a half mirror as described above, and separates subject light into an ordinary ray and an extraordinary ray by the OLPF, thereby suppressing the occurrence of false color (moire) in a photographed image.

SUMMARY OF THE INVENTION

However, the OLPF made of a rock crystal used as a birefringent plate in the image pickup apparatus of the above-described Patent Document 1 is expensive and heavy, thus becoming a factor in an increase in cost and increasing the weight of the image pickup apparatus. It is desirable to reduce such OLPFs as much as possible.

The present invention has been made in view of the above-described problems. It is desirable to provide an image pickup apparatus that can reduce OLPFs used as birefringent plates.

An embodiment of the present invention is an image pickup apparatus including: an image pickup device for receiving subject light passed through a photographing optical system by an image pickup surface in which a pixel arrangement is formed, and generating an image signal; and an optically transparent film having an optical anisotropy, and disposed in front of the image pickup surface, the subject light entering the optically transparent film; wherein a width of separation between a first ray of light and a second ray of light produced by birefringence in the optically transparent film is ½ or more of a pixel pitch in the pixel arrangement.

According to an embodiment of the present invention, the width of separation between the first ray of light and the second ray of light produced by birefringence in the optically transparent film having the optical anisotropy is ½ or more of the pixel pitch in the pixel arrangement formed in the image pickup surface. Thus, because this optically transparent film functions as a birefringent plate, optical low-pass filters used as birefringent plates can be reduced.

DETAILED DESCRIPTION OF THE PREFERRED EMBODIMENTS

First Embodiment

[Configuration of Principal Parts of Image Pickup Apparatus]

Figure 1:
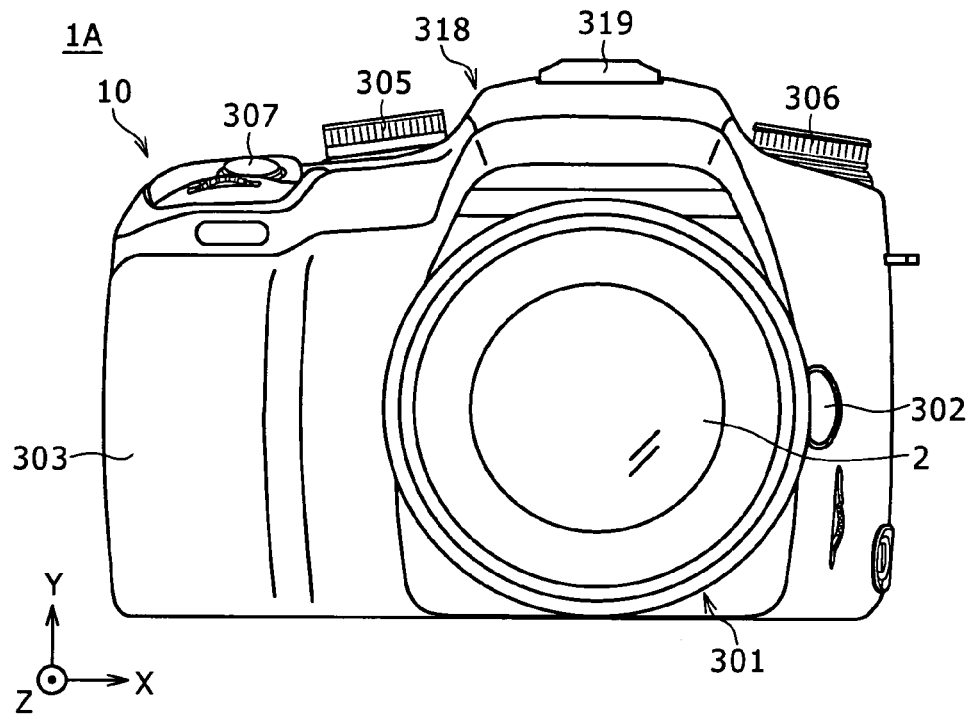
FIG. 1 is a front view of an external configuration of an image pickup apparatus according to a first embodiment of the present invention.

FIG. 1 is a front view of an external configuration of an image pickup apparatus 1A according to a first, embodiment of the present invention.

The image pickup apparatus 1A is formed as a single-lens reflex type digital still camera. The image pickup apparatus 1A includes a camera body 10 and an interchangeable lens 2 as a photographing lens detachable from the camera body 10.

In FIG. 1, the front side of the camera body 10 has a mount part 301 mounted with the interchangeable lens 2 at substantially the center of the front side, a lens replacing button 302 disposed on the right side of the mount part 301, and a grip part 303 for allowing a grip. The camera body 10 has a mode setting dial 305 disposed on the upper left part of the front side, a control value setting dial 306 disposed on the upper right part of the front side, and a shutter button 307 disposed on the top surface of the grip part 303.

The camera body 10 also has, on the top part thereof, a flash part 318 formed as a pop-up type built-in flash and a connecting terminal part 319 used when an external flash or the like is attached to the camera body 10.

Figure 3:
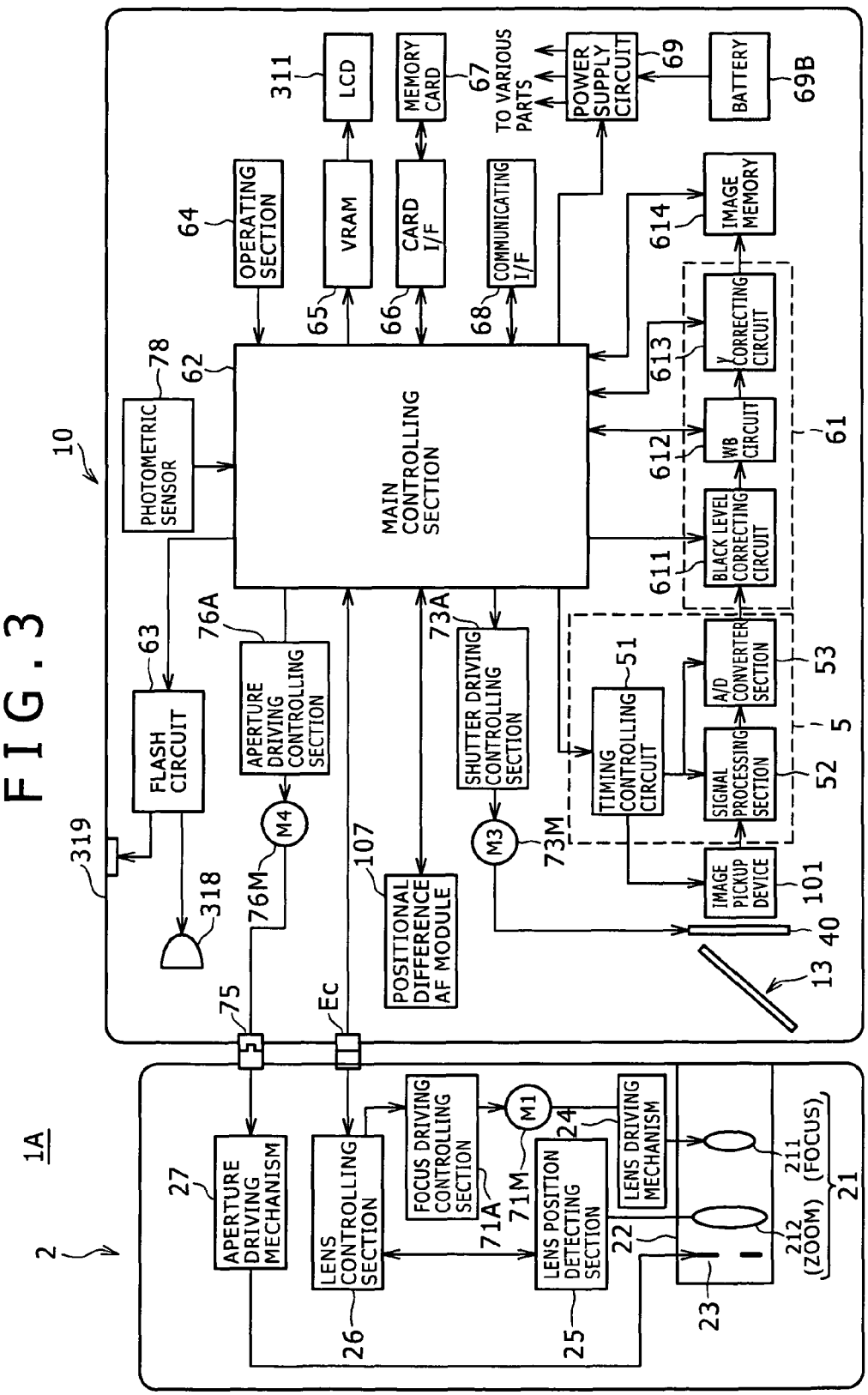
FIG. 3 is a block diagram showing an electrical configuration of the image pickup apparatus.

The mount part 301 has a connector Ec for making an electric connection with the mounted interchangeable lens 2 (see FIG. 3) and a coupler 75 for making a mechanical connection (see FIG. 3).

The lens replacing button 302 is pressed to remove the interchangeable lens 2 mounted in the mount part 301.

The grip part 303 allows a user to hold the image pickup apparatus 1A at a time of photographing. The grip part 303 is provided with surface depressions and projections conforming to the shape of fingers to enhance a fitting quality. Incidentally, the grip part 303 has therewithin a battery housing compartment and a card housing compartment (not shown). The battery housing compartment houses a battery 69B (see FIG. 3) as a power supply of the camera. The card housing compartment detachably houses a memory card 67 (see FIG. 3) for recording the image data of photographed images. Incidentally, the grip part 303 may have a grip sensor for detecting whether or not the grip part 303 is held by the user.

The mode setting dial 305 and the control value setting dial 306 are formed of a member in substantially the shape of a disk rotatable in a plane substantially parallel to the top surface of the camera body 10. The mode setting dial 305 is to alternatively select modes and functions incorporated into the image pickup apparatus 1A, such as an automatic exposure (AE) control mode, an automatic focus (AF; autofocus) control mode, various photographing modes such as a still image photographing mode for photographing a single still image, a serial photographing mode for performing serial photographing, and the like, a reproduction mode for reproducing a recorded image, and the like. The control value setting dial 306 is to set a control value for the various functions incorporated into the image pickup apparatus 1A.

The shutter button 307 is a pressing switch allowing an operation for a "half pressed state" of being pressed halfway and an operation for a "fully pressed state" of being further pressed. When the shutter button 307 is pressed halfway in the still image photographing mode, preparatory operations for photographing a still image of a subject (preparatory operations such as the setting of an exposure control value, focus detection and the like) are performed. In addition, when the shutter button 307 is fully pressed, a photographing operation (a series of operations of exposing an image pickup device 101 (see FIG. 2) to light, subjecting an image signal obtained by the exposure to predetermined image processing, and recording the image signal in the memory card 67 (see FIG. 3) or the like) is performed.

The interchangeable lens 2 functions as a lens window for taking in light (light image) from a subject and a photographing optical system for guiding the light from the subject to the image pickup device 101 disposed inside the camera body 10. The interchangeable lens 2 can be removed from the camera body 10 by performing an operation of pressing the lens replacing button 302 described above.

Figure 2:
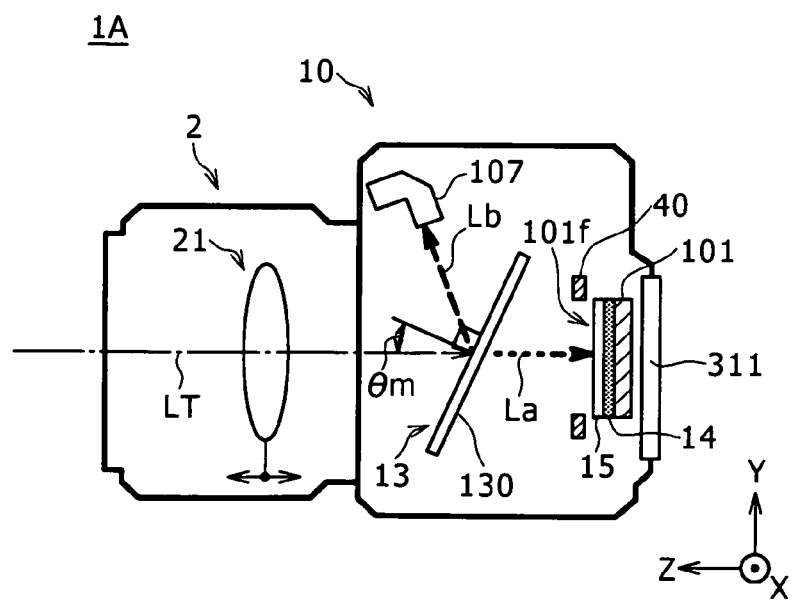
FIG. 2 is a longitudinal sectional view of the image pickup apparatus.

The interchangeable lens 2 includes a lens group 21 formed of a plurality of lenses arranged serially along an optical axis LT (see FIG. 2). The lens group 21 includes a focus lens 211 (see FIG. 3) for adjusting focus and a zoom lens 212 (see FIG. 3) for varying magnification. The focus lens 211 and the zoom lens 212 are each driven in the direction of the optical axis LT (see FIG. 2), whereby magnification variation and focus adjustment are performed. The interchangeable lens 2 also has an operating ring rotatable along the outer circumferential surface of a lens barrel at an appropriate position of the outer circumference of the lens barrel. The zoom lens 212 is moved in the direction of the optical axis according to a direction of rotation of the operating ring and an amount of rotation of the operating ring by a manual operation or an automatic operation, and is set at a zoom magnification (photographing magnification) corresponding to a position to which the zoom lens 212 is moved.

[Internal Configuration of Image Pickup Apparatus 1A]

The internal configuration of the image pickup apparatus 1A will next be described. FIG. 2 is a longitudinal sectional view of the image pickup apparatus 1A. As shown in FIG. 2, the camera body 10 has therewithin the image pickup device 101, a mirror section 13, a phase difference AF module 107, and the like.

The image pickup device 101 is disposed on the optical axis LT of the lens group included in the interchangeable lens 2 when the interchangeable lens 2 is mounted on the camera body 10 in a direction perpendicular to the optical axis LT. Used as the image pickup device 101 is for example a CMOS color area sensor (CMOS type image pickup device) having a Bayer arrangement in which a plurality of pixels formed with a photodiode are two-dimensionally arranged in the form of a matrix and color filters of R (red), G (green), and B (blue), for example, having respective different spectral characteristics are arranged on the light receiving surface of each pixel at a ratio of 1:2:1. The image pickup device 101 receives subject light (light image of a subject) passed through the interchangeable lens 2 by an image pickup surface 101f in which a pixel arrangement thus provided with three kinds of (R, G, and B) color filters is formed, and converts the subject light into analog electric signals (image signals) of respective color components, thereby generating image signals of respective colors of R, G, and B.

An optical low-pass filter (hereinafter also abbreviated to an "OLPF") 14 is disposed immediately in front of the image pickup device 101. A phase resolving plate 15 is disposed immediately in front of the OLPF 14.

The OLPF 14 is an optical device including a rock crystal. The OLPF 14 removes a high-frequency component of spatial frequencies in incident light, and performs point image separation using birefringence to suppress a false color (moire) in an image obtained by the image pickup device 101.

The phase resolving plate 15 is formed as a quarter-wave plate ($\lambda/4$ plate), for example. The phase resolving plate 15 converts linearly polarized light into circularly polarized light.

The mirror section 13 as a pellicle mirror (fixed type mirror) formed with a half mirror (semitransparent mirror) 130 is disposed in front of the image pickup surface 101f of the image pickup device 101 on the above-described optical axis LT in such a manner as to be fixed to the camera body 10. The half mirror 130 is formed so as to transmit a part of subject light passed through the interchangeable lens 2 and reflect the other light toward the phase difference AF module 107. In other words, the half mirror 130 separates the subject light passed through the interchangeable lens 2 into transmitted light La and reflected light Lb, and the image pickup device 101 receiving the transmitted light La generates an image signal related to the subject. In this case, the half mirror 130 is disposed such that an angle (disposition angle) $\theta m$ formed between a normal to the principal plane of the half mirror 130 and the optical axis of the interchangeable lens (photographing optical system) 2 is less than 45° (for example 35° to 40°). Such a disposition angle allows the phase difference AF module 107 to be disposed diagonally above the half mirror 130 as shown in FIG. 2 rather than immediately above the half mirror 130. Thus, the image pickup apparatus 1A is reduced in height, and the image pickup apparatus 1A is miniaturized. Incidentally, the configuration of the half mirror 130 will be described later in detail.

The phase difference AF module 107 is formed as a so-called AF sensor made of a distance measuring element or the like for obtaining focus detection information (focus information) related to the subject. The phase difference AF module 107 is disposed diagonally above and in front of the half mirror 130. The phase difference AF module 107 detects an in-focus position by focus detection of a phase difference detecting system (hereinafter referred to also as "phase difference AF"). Incidentally, the phase difference AF module 107 functioning as a focus detecting section can always receive the reflected light Lb from the half mirror 130 at the times of photographing and the like, and is thus capable of constant focus detection related to the subject.

A shutter unit 40 is disposed in front of the image pickup device 101. The shutter unit 40 is formed as a mechanical focal-plane shutter having a curtain moving in a vertical direction and performing an optical path opening operation and an optical path blocking operation on the subject light guided to the image pickup device 101 along the optical axis LT by an opening operation and a closing operation on the curtain. Incidentally, the shutter unit 40 can be omitted when the image pickup device 101 is a complete electronic shutter-capable image pickup device.

In addition, an LCD (Liquid Crystal Display) 311 is disposed in the rear of the camera body 10. The LCD 311 has a color liquid crystal panel capable of image display. The LCD 311 for example displays an image picked up by the image pickup device 101 and displays a reproduced recorded image, and displays a screen for setting functions and modes incorporated in the image pickup apparatus 1A. At a time of determining a frame of a subject (framing) before photographing proper, the LCD 311 makes a live view (preview) display that displays the subject in a moving image mode on the basis of an image signal sequentially generated by the image pickup device 101 receiving the transmitted light La transmitted by the half mirror 130.

[Electrical Configuration of Image Pickup Apparatus 1A]

FIG. 3 is a block diagram showing an electrical configuration of the image pickup apparatus 1A. In FIG. 3, the same members and the like as in FIG. 1 and FIG. 2 are identified by the same reference numerals. Incidentally, for the convenience of description, the electrical configuration of the interchangeable lens 2 will be described first.

The interchangeable lens 2 includes a lens driving mechanism 24, a lens position detecting section 25, lens controlling section 26, and an aperture driving mechanism 27 in addition to the above-described lens group 21.

In the lens group 21, the focus lens 211 and the zoom lens 212 as well as an aperture 23 for adjusting an amount of light made incident on the image pickup device 101 included in the camera body 10 are retained in the direction of the optical axis LT (FIG. 2) within a lens barrel 22 to capture the light image of a subject and form the image on the image pickup device 101. In AF control, the focus lens 211 is driven in the direction of the optical axis LT by an AF actuator 71M within the interchangeable lens 2, whereby focus adjustment is made.

A focus driving controlling section 71A generates a driving controlling signal for the AF actuator 71M which signal is necessary to move the focus lens 211 to an in-focus position on the basis of an AF control signal supplied from a main controlling section 62 via the lens controlling section 26. The AF actuator 71M is formed by a stepping motor or the like, and provides a lens driving force to the lens driving mechanism 24.

The lens driving mechanism 24 is for example formed by a helicoid and a gear or the like for rotating the helicoid which gear or the like is not shown in the figure. Receiving the driving force from the AF actuator 71M, the lens driving mechanism 24 drives the focus lens 211 or the like in a direction parallel to the optical axis LT. Incidentally, the travelling direction and the amount of travelling of the focus lens 211 are respectively in accordance with the direction of rotation and the number of rotations of the AF actuator 71M.

The lens position detecting section 25 includes an encode plate having a plurality of code patterns formed at a predetermined pitch in the direction of the optical axis LT within a range of travelling of the lens group 21 and an encode brush moving integrally with the lenses while in sliding contact with the encode plate. The lens position detecting section 25 detects an amount of travelling at a time of focus adjustment of the lens group 21.

The lens controlling section 26 is for example formed by a microcomputer including memories such as a ROM storing a control program, a flash memory storing data related to state information, and the like.

The lens controlling section 26 also has a communicating function for communicating with the main controlling section 62 in the camera body 10 via the connector Ec. In this manner, the lens controlling section 26 can for example transmit, to the main controlling section 62, state information data on the focal length of the lens group 21, the position of an exit pupil, an aperture value, an in-focus distance, a state of an amount of ambient light, and the like as well as positional information on the position of the focus lens 211 which position is detected by the lens position detecting section 25, and receive data on an amount of driving of the focus lens 211, for example, from the main controlling section 62.

The aperture driving mechanism 27 changes the aperture diameter of the aperture 23 by receiving a driving force from an aperture driving actuator 76M via the coupler 75.

The electrical configuration of the camera body 10 will next be described. The camera body 10 includes an AFE (analog front end) 5, an image processing section 61, an image memory 614, a main controlling section 62, a flash circuit 63, an operating section 64, a VRAM 65, a card I/F 66, and a memory card 67 in addition to the image pickup device 101, the shutter unit 40 and the like described earlier. The camera body 10 also includes a communicating I/F 68, a power supply circuit 69, a battery 69B, a shutter driving controlling section 73A and a shutter driving actuator 73M, and an aperture driving controlling section 76A and an aperture driving actuator 76M.

The image pickup device 101 is formed by a CMOS color area sensor, as described above. The image pickup operation of the image pickup device 101 such as a start (and an end) of exposure operation of the image pickup device 101, selection of output of each pixel possessed by the image pickup device 101, readout of an image signal, and the like is controlled by a timing controlling circuit 51 to be described later.

The AFE 5 supplies a timing pulse for making the image pickup device 101 perform a predetermined operation. In addition, the AFE 5 subjects a subject image signal output from the image pickup device 101 to predetermined signal processing, converts a resulting image signal into a digital signal, and then outputs the digital signal to the image processing section 61. The AFE 5 includes a timing controlling circuit 51, a signal processing section 52, an A/D converter section 53.

The timing controlling circuit 51 generates a predetermined timing pulse (a pulse for generating a vertical scanning pulse $\phi Vn$, a horizontal scanning pulse $\phi Vm$, a reset signal $\phi Vr$ and the like) on the basis of a reference clock output from the main controlling section 62, and outputs the timing pulse to the image pickup device 101, thereby controlling the image pickup operation of the image pickup device 101. In addition, the timing controlling circuit 51 controls the signal processing section 52 and the A/D converter section 53 by outputting the predetermined timing pulse to each of the signal processing section 52 and the A/D converter section 53.

The signal processing section 52 subjects an analog image signal output from the image pickup device 101 to predetermined analog signal processing. The signal processing section 52 includes a CDS (correlated double sampling) circuit, an AGC (auto gain control) circuit, and a clamp circuit. The AGC circuit can amplify the image signal generated in the image pickup device 101 with a variable amplification factor (gain). ISO speed corresponding to a silver halide film can be changed by varying the gain. The A/D converter section 53 converts analog R, G, and B image signals output from the signal processing section 52 into digital image signals composed of a plurality of bits (for example 12 bits) on the basis of the timing pulse output from the timing controlling circuit 51.

The image processing section 61 subjects image data output from the AFE 5 to predetermined signal processing, and creates an image file. The image processing section 61 includes a black level correcting circuit 611, a white balance controlling circuit 612, and a gamma correcting circuit 613. Incidentally, the image data captured into the image processing section 61 is written to the image memory 614 on a temporary basis in synchronism with the readout of the image pickup device 101, and the image data written in the image memory 614 is thereafter accessed so that each block in the image processing section 61 performs processing.

The black level correcting circuit 611 corrects the black level of the R, G, and B digital image signals resulting from A/D conversion by the A/D converter section 53 to a reference black level.

The white balance correcting circuit 612 performs level conversion (white balance (WB) adjustment) of the digital signals of respective color components of R (red), G (green), and B (blue) on the basis of a reference of white in accordance with a light source. Specifically, the white balance controlling circuit 612 identifies a part estimated to be originally white in a photographed subject from luminance and color saturation data or the like on the basis of WB adjustment data supplied from the main controlling section 62, obtains an average of respective color components of R, G, and B of the part, a G/R ratio, and a G/B ratio, converts the average of the respective color components of R, G, and B of the part, the G/R ratio, and the G/B ratio into an R and a B correcting gain, and makes level correction.

The gamma correcting circuit 613 corrects the gradation characteristic of the WB-adjusted image data. Specifically, the gamma correcting circuit 613 performs nonlinear conversion of the level of the image data using a gamma correcting table set in advance for each color component, and makes offset adjustment.

The image memory 614 in a photographing mode temporarily stores the image data output from the image processing section 61 and is used as a work area for the main controlling section 62 to subject the image data to predetermined processing. The image memory 614 in a reproduction mode temporarily stores image data read out from the memory card 67.

The main controlling section 62 includes a CPU operating as a computer, a ROM storing a control program and the like, and a RAM for temporarily storing data. The main controlling section 62 controls the operation of each part of the image pickup apparatus 1A.

The flash circuit 63 in a flash photographing mode controls an amount of light emission of an external flash connected to the flash part 318 or the connecting terminal part 319 to an amount of light emission set by the main controlling section 62.

The operating section 64 includes the shutter button 307 described above and the like. The operating section 64 is to input operating information to the main controlling section 62.

The VRAM 65 has an image signal storage capacity corresponding to the number of pixels of the LCD 311. The VRAM 65 is a buffer memory between the main controlling section 62 and the LCD 311. The card I/F 66 is an interface allowing signal transmission and reception between the memory card 67 and the main controlling section 62. The memory card 67 is a recording medium for storing image data generated by the main controlling section 62. The communicating I/F 68 is an interface allowing transmission of image data and the like to a personal computer and other external devices.

The power supply circuit 69 is for example formed by a constant-voltage circuit or the like. The power supply circuit 69 generates voltage for driving the whole of the image pickup apparatus 1A including controlling sections such as the main controlling section 62, the image pickup device 101, and various other driving sections. Incidentally, the energization of the image pickup device 101 is controlled by a controlling signal supplied from the main controlling section 62 to the power supply circuit 69. The battery 69B is formed by a secondary battery such as a nickel metal hydride rechargeable battery or a primary battery such as an alkaline dry cell. The battery 69B is a power supply for supplying power to the whole of the image pickup apparatus 1A.

The shutter driving controlling section 73A generates a driving control signal for the shutter driving actuator 73M on the basis of a controlling signal supplied from the main controlling section 62. The shutter driving actuator 73M performs opening and closing driving (opening and closing operation) of the shutter unit 40.

The aperture driving controlling section 76A generates a driving control signal for the aperture driving actuator 76M on the basis of a controlling signal supplied from the main controlling section 62. The aperture driving actuator 76M provides a driving force to the aperture driving mechanism 27 via the coupler 75.

[Structure of Half Mirror 130]

Figure 4:
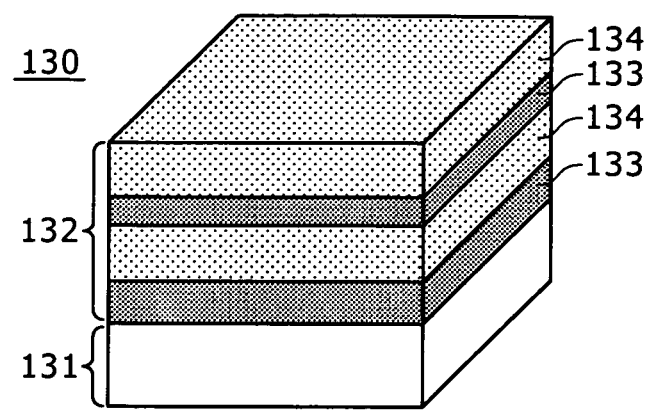
FIG. 4 is a diagram of assistance in explaining a sectional structure of a half mirror.

FIG. 4 is a diagram of assistance in explaining a sectional structure of the half mirror 130.

The half mirror 130 of the mirror section 13 includes a film 131 as a mirror substrate (mirror base material) and an inorganic layer (layer of an inorganic material) 132 deposited and formed on the film 131. The half mirror 130 has a light transmission characteristic (reflection characteristic) of a transmittance of 70% (reflectance of 30%), for example.

Figure 7:
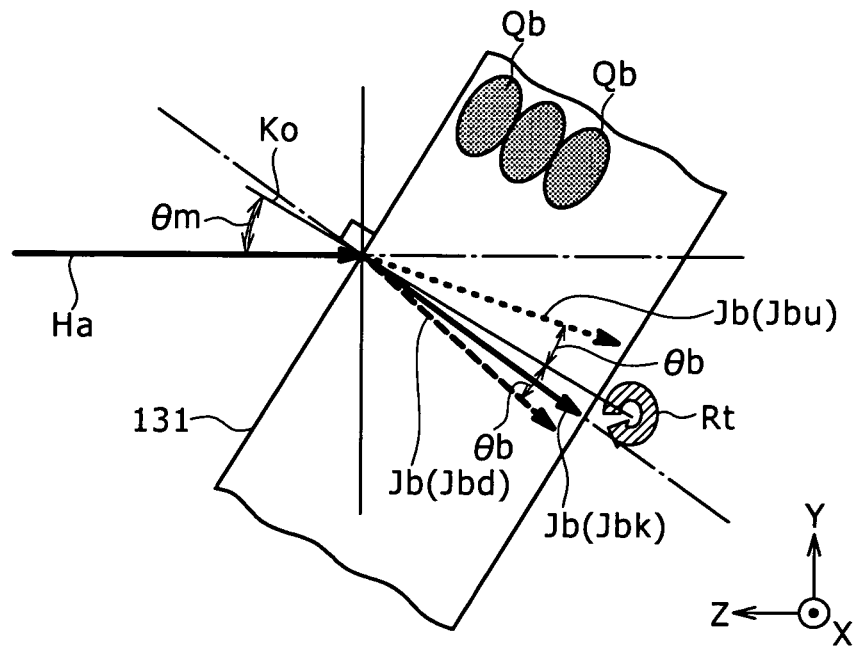
FIG. 7 is a conceptual diagram of assistance in explaining a mechanism of separation of a ray of light using birefringence in the film.

The film 131 is for example an optically transparent film having a transmittance of 80% or more and having a certain rigidity. The film 131 is formed by a material having an optical anisotropy, for example PET (polyethylene terephthalate). The film 131 is manufactured by undergoing a biaxial stretching process including longitudinal stretching and lateral stretching, for example. The film 131 has optical characteristics of an index ellipsoid Qb compressed in a direction of thickness of the film 131 as shown in FIG. 7. Incidentally, while the stretching process and the like are performed with an objective of manufacturing the film 131 as a film having in-plane isotropy, it is difficult to manufacture the film 131 uniformly in a direction of width for about five meters, and consequently a film including a biaxial crystal (which film will hereinafter be also abbreviated to a "biaxial film") is manufactured.

The inorganic layer 132 is formed by alternately laminating a layer 133 of a niobium pentoxide ($Nb_2O_5$) and a layer 134 of a silicon dioxide ($SiO_2$). When for example the number of laminated layers is changed, a ratio between the quantities of the transmitted light La (FIG. 2) and the reflected light Lb (FIG. 2) of the half mirror 130 can be adjusted. In other words, the half mirror 130 having a reflectance of 30% as described above can be formed by properly adjusting the number of laminated layers or the like of the inorganic layer 132 formed on the film 131.

Characteristics of the film 131 as a biaxial film will be described in the following with reference to FIGS. 5A and 5B.

Figure 5A:
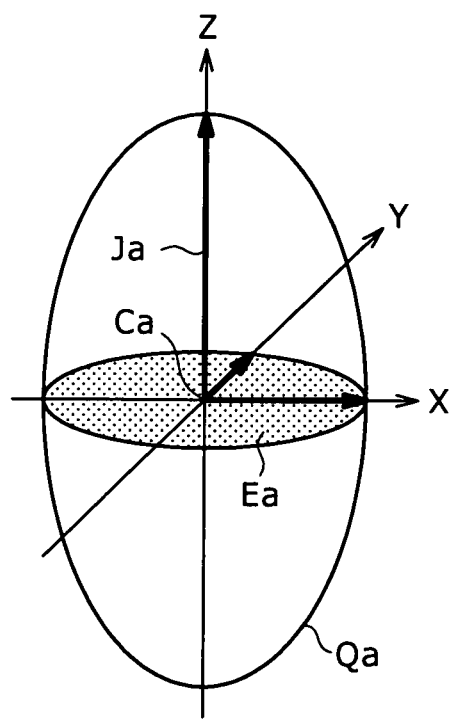
FIGS. 5A and 5B are diagrams of assistance in explaining characteristics of a film.
Figure 5B:
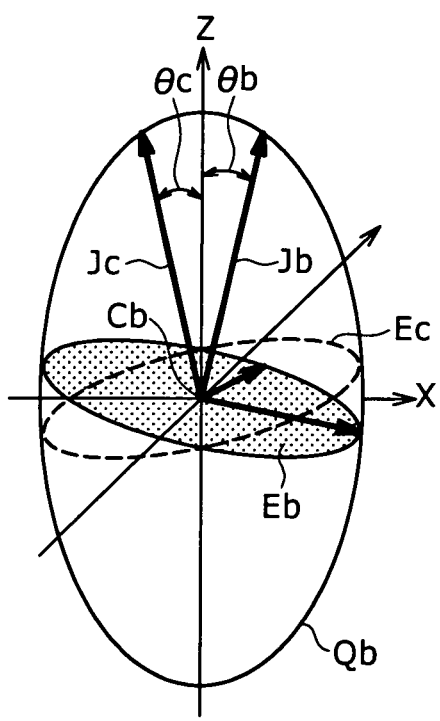

FIGS. 5A and 5B are diagrams of assistance in explaining characteristics of the film 131. FIG. 5A shows an index ellipsoid Qa of a uniaxial crystal. FIG. 5B shows an index ellipsoid Qb of a biaxial crystal.

As for the index ellipsoid Qa, letting Nx, Ny, and Nz be indexes of refraction in respective directions of an X-axis, a Y-axis, and a Z-axis, a relation Nx=Ny≠Nz holds. The index ellipsoid Qa has the form of a regular ellipsoid. In such an index ellipsoid Qa, the directions of the Z-axis and an optical axis Ja coincide with each other. The Z-axis is defined along a direction of a major axis of the index ellipsoid Qa. The optical axis Ja is defined along a normal extending from a cross section Ea (hatched part) passing through a center Ca of the index ellipsoid Qa and having a circular shape. Incidentally, because the index of refraction Nx in the direction of the X-axis of the index ellipsoid Qa is equal to the index of refraction Ny in the direction of the Y-axis of the index ellipsoid Qa, the circular cross section Ea is defined on an XY plane orthogonal to the Z-axis.

On the other hand, as for the index ellipsoid Qb, letting Nx, Ny, and Nz be indexes of refraction in respective directions of an X-axis, a Y-axis, and a Z-axis, a relation Nx≠Ny≠Nz (where Nx≈Ny) holds. The index ellipsoid Qb has the form of an ellipsoid somewhat distorted as compared with the index ellipsoid Qa. In such an index ellipsoid Qb, a cross section Eb (hatched part) and a cross section Ec (represented by a broken line) passing through a center Cb of the index ellipsoid Qb and having a circular shape are tilted with respect to an XY plane, and thus an optical axis Jb and an optical axis Jc extending along directions of normals from the cross sections Eb and Ec are inclined with respect to the Z-axis. In this case, angles of inclination θb and θc of the optical axes Jb and Jc with respect to the Z-axis are for example about 5° to 40°. The film 131 of the biaxial crystal having the optical characteristics of the index ellipsoid Qb has birefringence.

The image pickup apparatus 1A including the half mirror 130 as described above can suppress the occurrence of false color (moire) in a photographed image by point image separation using the birefringence of the film 131. A method of the point image separation will be described below in detail.

[Method of Point Image Separation in Image Pickup Apparatus 1A]

Figure 6:
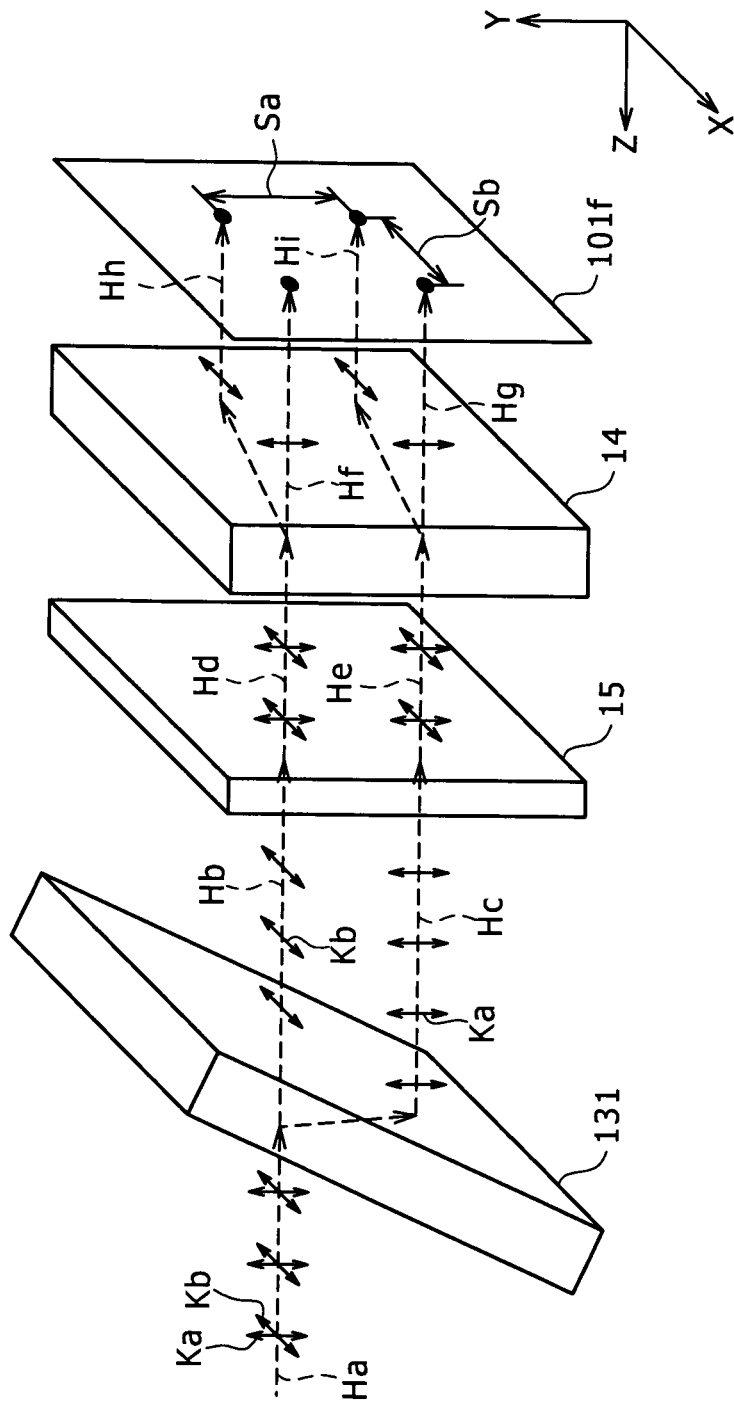
FIG. 6 is a conceptual diagram of assistance in explaining a method of point image separation in the image pickup apparatus.

FIG. 6 is a conceptual diagram of assistance in explaining a method of point image separation in the image pickup apparatus 1A. To be exact, both rays of light transmitted by the biaxial film are extraordinary rays. However, calculation can be made with both rays of light transmitted by the biaxial film regarded roughly as an ordinary ray and an extraordinary ray in the biaxial film with Nx≈Ny≠Nz.

First, when a ray of unpolarized light (subject light) Ha having polarizations Ka and Kb in a vertical direction (Y-direction) and a horizontal direction (X-direction) enters the film 131 of the half mirror 130 along the direction of the optical axis LT of the interchangeable lens 2, the ray of light Ha is separated in the vertical direction (Y-direction) by a separation width Sa corresponding to the pixel pitch (interval between adjacent pixels) of the image pickup surface 101f, for example, due to the birefringence of the film 131. Thus, an ordinary ray Hb having the polarization Kb in the horizontal direction and an extraordinary ray Hc having the polarization Ka in the vertical direction, for example, are emitted from the film 131 to the phase resolving plate 15. Incidentally, it is not essential that the separation width Sa between the ordinary ray Hb and the extraordinary ray Hc produced due to birefringence in the film 131 that the ray of light (subject light) Ha from a subject enters be equal to the pixel pitch in the pixel arrangement of the image pickup surface 101f. It suffices for the separation width Sa to be for example a separation width such that when the ordinary ray Hb enters the center of a pixel, the extraordinary ray Hc enters an adjacent pixel, specifically a separation width of ½ to 3/2 of the pixel pitch. It suffices to determine resolution and the separation width effective against false color arbitrarily.

Next, the ordinary ray Hb and the extraordinary ray Hc having linear polarization are converted into rays having circular polarization by the phase resolving plate 15. Thus, two rays Hd and He having the polarizations Ka and Kb in the vertical direction (Y-direction) and the horizontal direction (X-direction) are produced and made incident on the OLPF 14. Then, these rays Hd and He are made incident on the OLPF 14, and separated in the horizontal direction (X-direction) by a separation width Sb corresponding to the pixel pitch of the image pickup device 101, for example. Thus, two ordinary rays Hf and Hg and two extraordinary rays Hh and Hi are produced. The four rays Hf to Hi are emitted to the image pickup device 101.

The four rays Hf to Hi entering the image pickup surface 101f of the image pickup device 101 have the separation width Sa in the vertical direction (Y-direction) and the separation width Sb in the horizontal direction (X-direction), the separation width Sa and the separation width Sb corresponding to the pixel pitch of the image pickup device 101, as described above. A proper four-point separation is thus realized on the image pickup surface 101f. As a result, the occurrence of false color (moire) can be suppressed effectively in the image pickup device 101 having color filters arranged in the Bayer arrangement.

The image pickup apparatus 1A thus uses the film 131 rather than the OLPF to separate the subject light in the vertical direction. The separation of the ray of light using birefringence in the film 131 will be described with reference to FIG. 7.

FIG. 7 is a conceptual diagram of assistance in explaining a mechanism of the separation of the ray of light using birefringence in the film 131.

The film 131 is formed as a biaxial film, as described above. The optical axis Jb of the film 131 is for example inclined by an angle of inclination θb (for example 5° to 40°) with respect to the Z-axis as in the index ellipsoid Qb shown in FIG. 5B. Hence, when a rotation Rt of the film 131 about a rotation axis Ko is effected while an angle of disposition θm (for example 35° to 40°) of the film 131 is maintained, the angle of inclination of the optical axis Jb can be changed between an upper limit position of an optical axis Jbu resulting from adding the angle of inclination θb to the rotation axis Ko and a lower limit position of an optical axis Jbd resulting from subtracting the angle of inclination θb from the rotation axis Ko. For example, supposing that the angle of disposition θm of the film 131 is 37° and that the angle of inclination θb of the optical axis Jb in the index ellipsoid Qb is 20°, when the film 131 is rotated 360° about the rotation axis Ko, the inclination of the optical axis Jb changes in a range of 17° to 57°.

On the other hand, when an angle formed between the ray of light Ha and the optical axis Jb of the film 131 is set at 45°, the width of separation of the ray of light due to birefringence is maximized, and thus effective point image separation is made possible.

Accordingly, using change in the inclination of the optical axis Jb by the rotation Rt of the film 131 as already described, a search is made for a direction of disposition of the film 131 such that the direction of the optical axis Jb is 45° with respect to the ray of incident light Ha as with an optical axis Jbk shown in FIG. 7 while rotating the film 131, and the film 131 is fixed in the direction of disposition. Thus, a maximum separation due to birefringence occurs in the biaxial film 131, and thus effective point image separation can be performed. In other words, even when the film 131 is provided to the half mirror 130 whose angle of disposition θm is for example 35° to 40°, the film 131 can be disposed in a state of effecting a maximum separation (state of the direction of the optical axis Jb being 45° with respect to the ray of incident light Ha) by rotating the biaxial film 131 having the inclined optical axis Jb.

Next, the width of separation of a ray of light using birefringence in the film 131 will be described by taking a concrete example of calculation with reference to FIG. 8 and FIG. 9.

Figure 8:
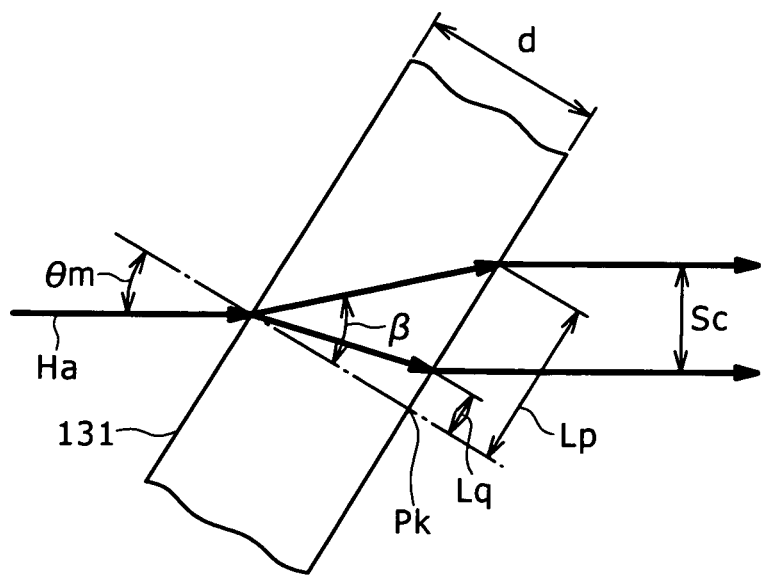
FIG. 8 is a diagram of assistance in explaining a width of separation of the ray of light using birefringence in the film.

First, as a precondition, the thickness of a biaxial film Fm formed of PET, for example, as in FIG. 8 is set at d=50 μm, and the indexes of refraction of the respective directions of the X-axis, the Y-axis, and the Z-axis in the index ellipsoid Qb shown in FIG. 5B is set at Nx=1.6407, Ny=1.6895, and Nz=1.4933. In this case, because Nx≈Ny, a width of separation Sc (FIG. 8) in the film 131 will be derived by approximate calculation treating the film 131 as a uniaxial crystal.

Figure 9:
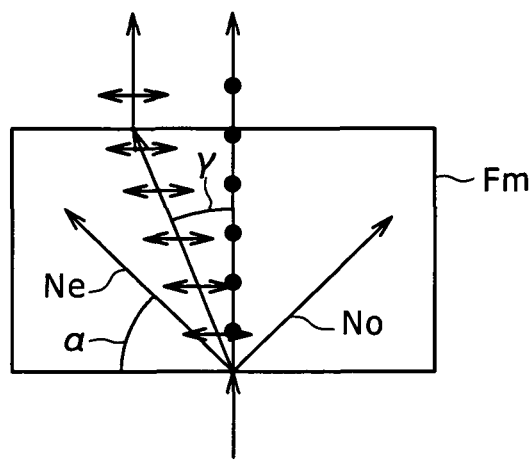
FIG. 9 is a diagram of assistance in explaining a width of separation of the ray of light using birefringence in the film.

FIG. 9 shows the index of refraction No of an ordinary ray and the index of refraction Ne of an extraordinary ray. These indexes of refraction No and Ne are the following values from the respective indexes of refraction Nx, Ny, and Nz in the directions of the X-axis, the Y-axis, and the Z-axis described above.

$Ne=Nz=1.4933$ $No=(Nx+Ny)/2=(1.6407+1.6895)/2=1.6651$

Then, a relative angle γ between angles of refraction of the ordinary ray and the extraordinary ray is obtained by using the following Equation (1).

$$\tan \gamma = (((Ne/No)^2 - 1) \times \tan \alpha)/(1 + (Ne/No)^2 \times \tan^2 \alpha) \quad (1)$$

In this case, when an angle formed between the optical axis of the film Fm and a ray of incident light is set at α=45° (angle at which a maximum separation occurs), and the indexes of refraction Ne and No described above are substituted into the above Equation (1), tan γ=−0.1085. Thus, a relative angle γ=−6.2° is obtained.

Next, the disposition angle of the film Fm is set at θm=37°, for example, and an angle of refraction β of the ordinary ray (FIG. 8) is obtained from the following equation based on Snell's law.

$1 \times \sin 37° = ((1.6407+1.6895)/2) \times \sin \beta$

Thus, the angle of refraction β=21.2° is obtained.

From the above, distances Lp and Lq from a point of intersection Pk of a normal drawn downward from a point of intersection of the ray of incident light Ha and the front surface of the film 131 and the rear surface (back surface) of the film 131 to respective points from which the ordinary ray and the extraordinary ray are emitted in the rear surface of the film 131 are obtained as follows.

$Lp=50\ \mu m \times \tan 21.2° = 19.4\ \mu m$ $Lq=50\ \mu m \times \tan(21.2-6.2)° = 13.4\ \mu m$ Hence, the separation width Sc is obtained as follows.

$Sc=(19.4-13.4) \times \sin(90°-37°)=4.8\ \mu m$

Thus the separation width Sc=4.8 μm is obtained in the biaxial film 131 having the thickness d=50 μm. In this case, in consideration of Nyquist frequency, point image separation in the image pickup device 101 having a pixel pitch 1.2 to 1.4 times the Nyquist frequency, for example a pixel pitch of 6 μm can be performed properly.

In the above, (i) the optical characteristics (indexes of refraction of the directions of the X-axis, the Y-axis, and the Z-axis described above) of the biaxial film, (ii) the inclination of the optical axis of the film with respect to the ray of incident light, and (iii) the thickness of the film are specified, and the width of separation of the light ray is calculated. Conversely, a desired separation width is obtained by adjusting (changing) the above-described conditions (parameters) (i) to (iii).

Incidentally, as an example of comparison with the film 131 made of PET, the thickness t of the OLPF 14 made of a rock Crystal providing the light ray separation width Sc=4.8 μm by birefringence is obtained by using the following Equation (2). Incidentally, No and Ne in the following Equation (2) are indexes of refraction of an ordinary ray and an extraordinary ray in the rock crystal.

$$Sc=(Ne^2-No^2)/(Ne^2+No^2) \times t = 5.876 \times 10^{-3} \times t \quad (2)$$

Substituting Sc=4.8 μm into the above Equation (2) yields the thickness t of the OLPF 14=817 μm.

When the same separation width is to be obtained in point image separation thus using birefringence, the thickness of the film 131 made of PET needs to be only 1/16 of that of the OLPF 14 made of the rock crystal. Thus, the thickness of a birefringent plate for performing point image separation can be reduced by the film 131 made of PET. As a result, the image pickup apparatus 1A can be miniaturized, and reduced in weight.

In the image pickup apparatus 1A described above, point image separation is performed using the film 131 formed of a biaxial crystal provided in the half mirror 130, whereby the film 131 functions as a birefringent plate. As a result, optical low-pass filters (OLPFs) used as birefringent plates can be reduced. Next, reasons that the film 131 is more desirably formed by a biaxial crystal than a uniaxial crystal will be described. Incidentally, the film 131 may be formed by a uniaxial film.

In a uniaxial film having an optical axis along a direction of thickness of the film, for example, the angle of inclination of the optical axis does not change even when the rotation Rt of the film as in FIG. 7 is performed. Thus, when the angle of disposition of the film 131 (half mirror 130) is not 45° as in the present embodiment, a maximum separation of a ray of light as described above cannot be performed, and to secure a necessary separation width requires an increase in the thickness of the film.

On the other hand, in the film of a biaxial crystal, the optical axis is inclined with respect to the direction of thickness of the film as described above. Thus, when the rotation Rt of the film is performed as in FIG. 7, the angle of inclination of the optical axis becomes 45° with respect to the ray of incident light, and thus a disposition of the film capable of a maximum separation of the ray of light is obtained. Thus, an effective point image separation is made possible, and the thickness of the film can be minimized.

Second Embodiment

Configuration of Principal Parts of Image Pickup Apparatus

Figure 10:
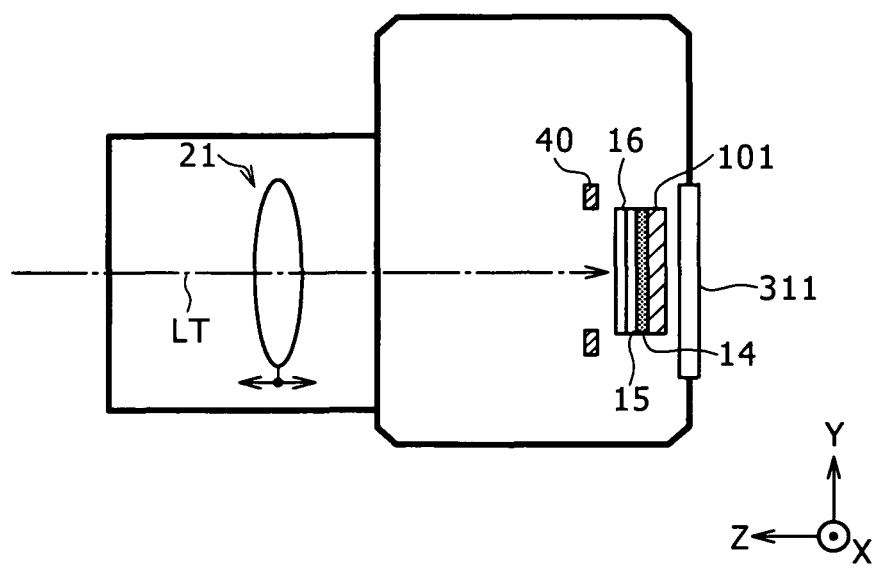
FIG. 10 is a longitudinal sectional view of an internal configuration of an image pickup apparatus according to a second embodiment of the present invention.

FIG. 10 is a longitudinal sectional view of an internal configuration of an image pickup apparatus 1B according to a second embodiment of the present invention. In this case, the same members and the like as in the image pickup apparatus 1A according to the first embodiment are identified by the same reference numerals.

The image pickup apparatus 1B according to the second embodiment is formed as a compact type digital camera not allowing the interchange of lenses rather than a single-lens reflex type digital still camera such as the image pickup apparatus 1A according to the first embodiment shown in FIG. 2 or the like.

Thus, in the image pickup apparatus 1B, the mirror section 13 (FIG. 2) provided in the image pickup apparatus 1A is omitted, and a film 16 similar to the film 131 used for point image separation is disposed immediately before a phase resolving plate 15.

A method of point image separation in the image pickup apparatus 1B formed as described above will be described below in detail.

[Method of Point Image Separation in Image Pickup Apparatus 1B]

Figure 11:
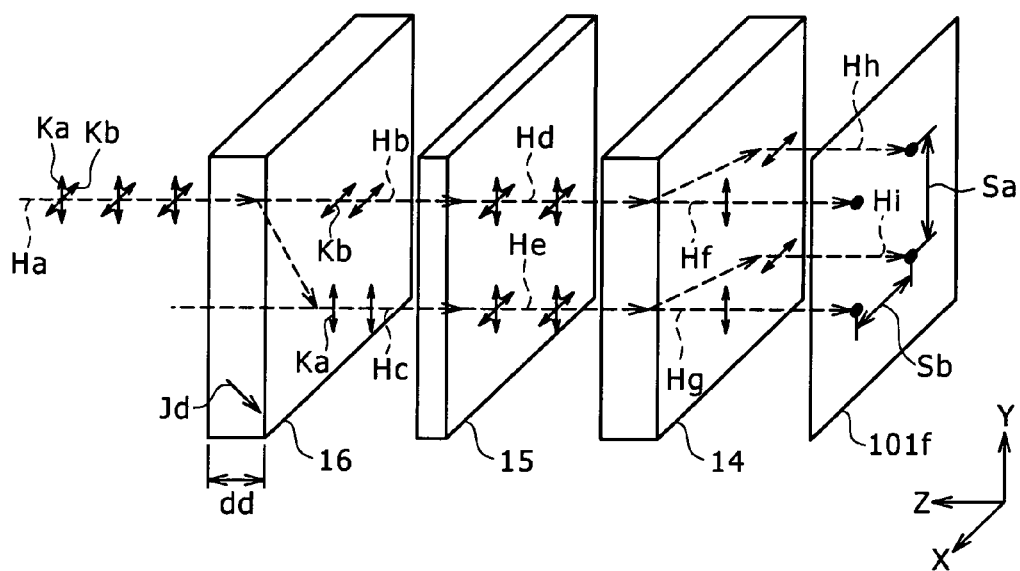
FIG. 11 is a conceptual diagram of assistance in explaining a method of point image separation in the image pickup apparatus.

FIG. 11 is a conceptual diagram of assistance in explaining a method of point image separation in the image pickup apparatus 1B.

First, when a ray of unpolarized light (subject light) Ha having polarizations Ka and Kb in a vertical direction (Y-direction) and a horizontal direction (X-direction) enters the film 16 made of PET, the ray of light Ha is separated in the vertical direction (Y-direction) due to birefringence in the film 16. In this manner, an ordinary ray Hb having the polarization Kb in the horizontal direction and an extraordinary ray Hc having the polarization Ka in the vertical direction, for example, are emitted from the film 16 to the phase resolving plate 15. In this case, because the film 16 is formed as a film formed of a biaxial crystal, an optical axis Jd (FIG. 11) is inclined by about 5° to 40°, for example, with respect to a direction of thickness of the film 16 as with the optical axis Jb of the index ellipsoid Qb shown in FIG. 5B, and light ray separation using birefringence is possible (to be described later in detail).

Next, the ordinary ray Hb and the extraordinary ray Hc having linear polarization are converted into rays having circular polarization by the phase resolving plate 15. Thus, two rays Hd and He having the polarizations Ka and Kb in the vertical direction (Y-direction) and the horizontal direction (X-direction) are produced and emitted to an OLPF 14. Then, these rays Hd and He are made incident on the OLPF 14, and separated in the horizontal direction (X-direction). In this manner, two ordinary rays Hf and Hg and two extraordinary rays Hh and Hi are produced, and are emitted to an image pickup device 101.

The four rays Hf to Hi entering an image pickup surface 101f for example have a separation width Sa in the vertical direction (Y-direction) and a separation width Sb in the horizontal direction (X-direction), the separation width Sa and the separation width Sb corresponding to the pixel pitch of the image pickup device 101. A proper four-point separation is thus realized on the image pickup surface 101f. As a result, the occurrence of false color (moire) can be suppressed effectively in an image obtained by the image pickup device 101.

Next, a film thickness necessary to obtain a desired separation width using the birefringence of the film 16 will be described by taking a concrete example of calculation with reference to FIG. 8 and FIG. 9 as in the first embodiment. Incidentally, unlike the film 131 according to the first embodiment, the film 16 according to the second embodiment is disposed in a direction perpendicular to the ray of incident light Ha. Therefore, the optical axis Jd is inclined by only about 5° to 40°, and an inclination of 45° effecting a maximum separation of the ray of light as in the first embodiment is not obtained. Hence, in the film 16, a desired separation width is obtained by increasing the thickness of the film as compared with the first embodiment.

First, as a precondition, the indexes of refraction of the respective directions of the X-axis, the Y-axis, and the Z-axis in the index ellipsoid Qb shown in FIG. 5B is set at Nx=1.6407, Ny=1.6895, and Nz=1.4933. Thus, the angle of inclination of the optical axis Jd with respect to the direction of thickness of the film 16 is 28°. Because Nx≈Ny, the thickness dd (FIG. 11) of the film 16 providing a light ray separation width of 5 µm, for example, will be derived by approximate calculation treating the film 16 as a uniaxial crystal.

As for the index of refraction No of the ordinary ray and the index of refraction Ne of the extraordinary ray shown in FIG. 9, Ne=1.4933 and No=1.6651 are obtained by performing a similar calculation to that of the first embodiment on the basis of the respective indexes of refraction Nx, Ny, and Nz in the directions of the X-axis, the Y-axis, and the Z-axis described above.

Then, a relative angle γ between angles of refraction of the ordinary ray and the extraordinary ray is obtained by using the above Equation (1) as in the first embodiment. In this case, when an angle α formed between the optical axis of the film 16 and a ray of incident light is set at 28° as in the above-described precondition, and the indexes of refraction Ne and No described above are substituted into Equation (1), tan γ=−0.0850. Thus, a relative angle γ=−4.86° is obtained.

Next, an angle of refraction β of the ordinary ray (FIG. 8) in the film 16 disposed in the direction perpendicular to the ray of incident light is obtained on the basis of Snell's law.

$$1 \times \sin 0° = ((1.6407+1.6895)/2) \times \sin \beta$$

In this manner, the angle of refraction β=0° is obtained.

From the above, distances Lp and Lq from the point Pk to respective points from which the ordinary ray and the extraordinary ray are emitted in the rear surface of the film 131 shown in FIG. 8 are obtained as follows with the thickness of the film 16 as dd.

$$Lp = dd \times \tan 0° = 0$$

$$Lq = dd \times \tan(-4.86)° = -0.085 \, dd$$

Hence, the thickness dd of the film 16 made of PET which thickness is necessary to obtain a separation width of 5 µm is as follows.

$$dd = 5 \, \mu m / 0.085 = 59 \, \mu m$$

Thus, in the image pickup apparatus 1B according to the second embodiment, the thickness of the film 16 is 59 µm. The film thickness is increased as compared with the film 131 according to the first embodiment, but can be reduced from the thickness of 817 µm of the OLPF 14 described above. As a result, as compared with an existing configuration using two OLPFs 14, the image pickup apparatus 1B can be miniaturized, and reduced in weight.

In the image pickup apparatus 1B described above, point image separation is performed using the film 16 formed of a biaxial crystal, whereby the film 16 functions as a birefringent plate. As a result, optical low-pass filters (OLPFs) used as birefringent plates can be reduced.

EXAMPLES OF MODIFICATION

Figure 12:
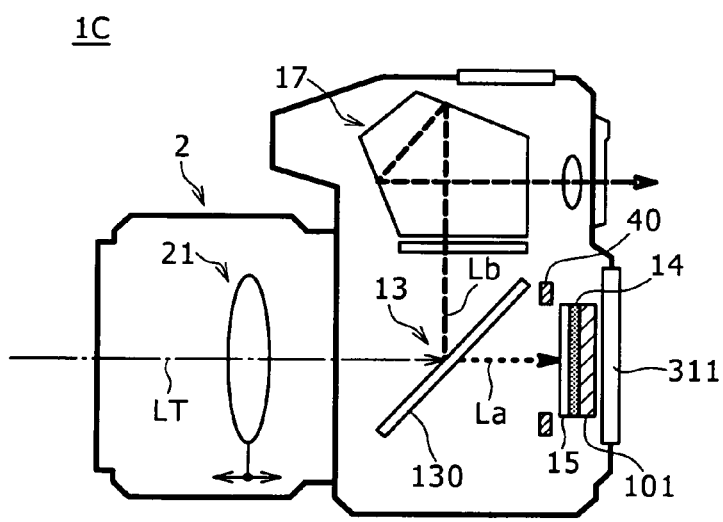
FIG. 12 is a longitudinal sectional view of an image pickup apparatus according to an example of modification of the present invention.

In each of the foregoing embodiments, it is not essential that the reflected light Lb from the half mirror 130 be made incident on the phase difference AF module 107 as in the image pickup apparatus 1A shown in FIG. 2. The reflected light Lb may be made incident on an optical finder 17 as in an image pickup apparatus 1C shown in FIG. 12.

In each of the foregoing embodiments, it is not essential that a PET film be used as a film of a biaxial crystal. A PEN (polyethylene naphthalate) or a PP (polypropylene) film may be used.

In each of the foregoing embodiments, it is not essential to perform a square four-point separation by combining the film 131 formed of a biaxial crystal, the phase resolving plate 15, and the OLPF 14 as shown in FIG. 6. Other point image separations using configurations to be described next may be performed. In the following, a method of square four-point separation in the first embodiment will first be described, and methods of other point image separations in contrast to the method of square four-point separation will thereafter be described with reference to FIGS. 13A to 13C and FIGS. 14A to 14C. Incidentally, in FIGS. 13A to 13C and FIGS. 14A to 14C, order of generation (order of separation) of rays of light (represented by circles) when the front (+Z direction) is viewed from the image pickup surface 101f is indicated by numbers within the circles.

(A) Square Four-Point Separation in First Embodiment

Figure 13A:
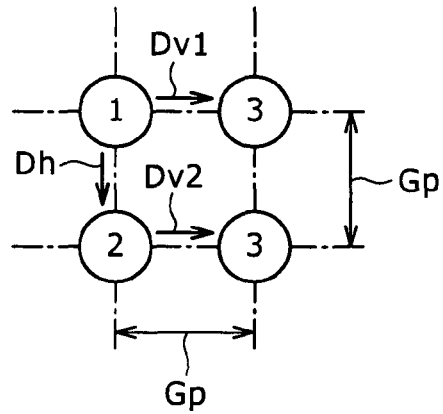
FIGS. 13A, 13B, and 13C are diagrams of assistance in explaining methods of point image separation according to examples of modification of the present invention.

In the first embodiment, as shown in FIG. 6, after a ray of incident light Ha is separated in the vertical direction (Y-direction) by the film 131 made of PET, and an ordinary ray Hb and an extraordinary ray Hc are generated, these rays of light Hb and Hc are passed through the phase resolving plate 15 and separated in the horizontal direction (X-direction) by the OLPF 14, whereby four rays of light Hf to Hi are generated. When this is shown in FIG. 13A, a ray of incident light (1) is separated in a vertical direction Dh with the separation width of a pixel pitch Gp, for example, to generate an extraordinary ray (2), and thereafter these rays of light (1) and (2) are separated in horizontal directions Dv1 and Dv2 with the separation width of the pixel pitch Gp, for example, to generate two extraordinary rays (3). Thus, color information and the like of the ray of light (1) can be obtained by three pixels on which the rays of light (2) and (3) are made incident (pixels adjacent on a right side, a lower side, and a lower right side). Thus the occurrence of false color (moire) can be suppressed in a photographed image. The same is true for the image pickup apparatus 1B according to the second embodiment.

(B) Four-Point Separation Not Requiring Phase Resolving Plate 15

In the first embodiment, four-point separation is performed by using a configuration having the phase resolving plate 15 inserted between the film 131 made of PET and the OLPF 14. Methods for performing four-point separation in a configuration without the phase resolving plate 15 will be described with reference to FIG. 13B and FIG. 13C.

Figure 13B:
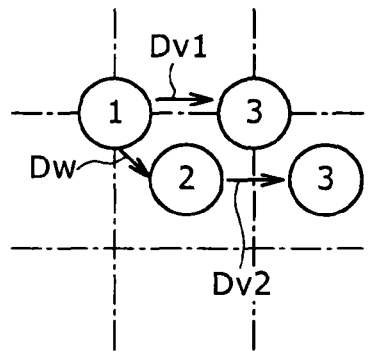
Figure 13C:
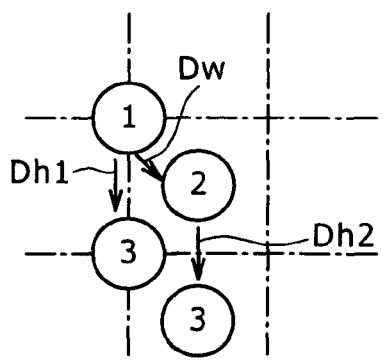

First, a ray of incident light (1) is separated in an obliquely downward direction Dw to the right as shown in FIG. 13B and FIG. 13C to generate an extraordinary ray (2). In this case, light ray separation in the obliquely downward direction Dw to the right is made possible by for example performing the rotation Rt of the film 131 made of PET as shown in FIG. 7 and disposing the optical axis of the film 131 along the obliquely downward direction Dw to the right with respect to the ray of incident light Ha. When light ray separation is thus performed in an oblique direction, polarized light components in the horizontal direction and the vertical direction remain. Thus, an OLPF having an optical axis inclined in the horizontal direction separates the rays of light (1) and (2) in horizontal directions Dv1 and Dv2 as in FIG. 13B, so that two extraordinary rays (3) can be generated. On the other hand, an OLPF having an optical axis inclined in the vertical direction separates the rays of light (1) and (2) in vertical directions Dh1 and Dh2 as in FIG. 13C, so that two extraordinary rays (3) can be generated.

The configurations as described above can perform proper four-point separation even when the phase resolving plate 15 used in the first embodiment is omitted. The same is true for the image pickup apparatus 1B according to the second embodiment.

(C) Two-Point Separation by Configuration without OLPF 14 or Phase Resolving Plate 15

In the first embodiment, four-point separation is performed by using the configuration combining the film 131 made of PET, the phase resolving plate 15, and the OLPF 14. A method of performing four-point separation by only the film 131 made of PET with the phase resolving plate 15 and the OLPF 14 omitted will be described with reference to FIGS. 14A to 14C.

Figure 14A:
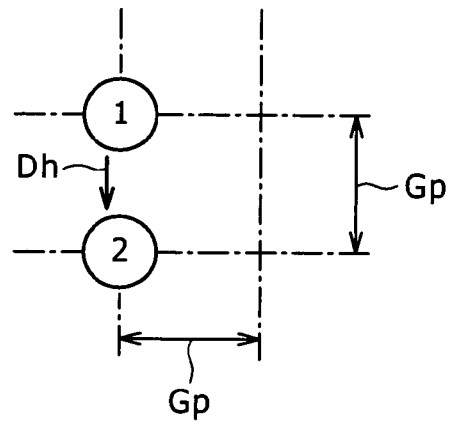
FIGS. 14A, 14B, and 14C are diagrams of assistance in explaining methods of point image separation according to examples of modification of the present invention.
Figure 14B:
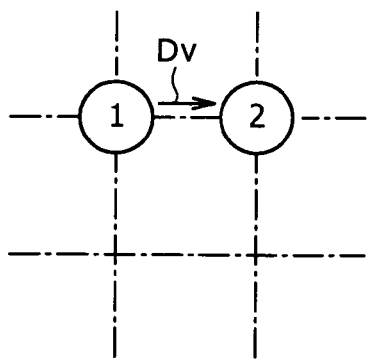
Figure 14C:
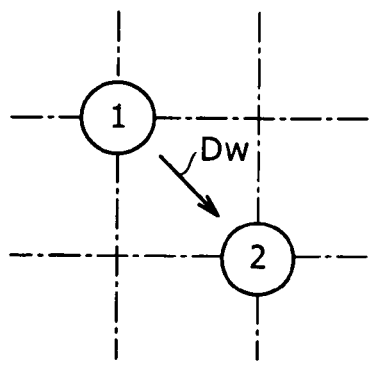

Light ray separation performed by using only the film 131 made of PET is two-point separations as shown in FIGS. 14A to 14C. Specifically, the film 131 made of PET which film is disposed such that the optical axis is inclined in a vertical direction separates a ray of incident light (1) in a vertical direction Dh with the separation width of a pixel pitch Gp, for example, to generate an extraordinary ray (2), as shown in FIG. 14A. In addition, the film 131 made of PET which film is disposed such that the optical axis is inclined in a horizontal direction separates a ray of incident light (1) in a horizontal direction Dv with the separation width of the pixel pitch Gp, for example, to generate an extraordinary ray (2), as shown in FIG. 14B. Further, the film 131 made of PET which film is disposed such that the optical axis is inclined in an oblique direction separates a ray of incident light (1) in an oblique direction Dw with the separation width of the pixel pitch Gp, for example, to generate an extraordinary ray (2), as shown in FIG. 14C.

The configurations as described above can perform two-point separation, and suppress false color (moire) in a photographed image by the two-point separation. The same is true for the image pickup apparatus 1B according to the second embodiment.

While the present invention has been described in detail, the above description is illustrative in all embodiments, and the present invention is not limited to the above description. An infinite number of unillustrated examples of modification are conceivable without departing from the scope of the present invention.

The present application contains subject matter related to that disclosed in Japanese Priority Patent Application JP 2009-156792 filed in the Japan Patent Office on Jul. 1, 2009, the entire content of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:

1. An image pickup apparatus comprising:
   an image pickup device for receiving subject light passed through a photographing optical system by an image pickup surface in which a pixel arrangement is formed, and generating an image signal; and
   an optically transparent film having an optical anisotropy, and disposed fixedly in front of said image pickup surface, said subject light entering the optically transparent film;

wherein a width of separation between a first ray of light and a second ray of light produced by birefringence in said optically transparent film is ½ or more of a pixel pitch in said pixel arrangement; and wherein an angle $\theta_m$ formed between a normal to said optically transparent film and an optical axis of said photographing optical system is fixed at a value less than 45°.

2. The image pickup apparatus according to claim 1, wherein said optically transparent film includes a biaxial crystal.

3. The image pickup apparatus according to claim 1, further comprising a half mirror for separating said subject light into transmitted light and reflected light, the half mirror being disposed fixedly,
wherein said image pickup device receives said transmitted light and generates said image signal, and
said optically transparent film is attached to said half mirror.

4. The image pickup apparatus according to claim 3, wherein said half mirror comprises an inorganic layer that is deposited upon said optically transparent film, said optically transparent film serving as a substrate for said inorganic layer.

5. The image pickup apparatus according to claim 4, wherein said half mirror has a reflectance of approximately 30%.

6. The image pickup apparatus according to claim 4, wherein said inorganic layer comprises alternately disposed layers of niobium pentoxide and silicon dioxide laminated together.

7. The image pickup apparatus according to claim 1, further comprising a focus detecting section configured to receive said reflected light, and obtain focus detection information related to a subject.

8. The image pickup apparatus according to claim 1, wherein said optically transparent film comprises PET (polyethylene terephthalate).

9. The image pickup apparatus according to claim 1, wherein said optically transparent film comprises PEN (polyethylene naphthalate).

10. The image pickup apparatus according to claim 1, wherein said optically transparent film comprises PP (polypropylene).

11. The image pickup apparatus according to claim 1, wherein said optically transparent film is formed using a biaxial stretching process including longitudinal stretching and lateral stretching.

12. The image pickup apparatus according to claim 1, wherein the angle $\theta_m$ is fixed between 35° and 40°.

13. The image pickup apparatus according to claim 12, wherein an angle $\theta_b$ formed between said optical axis of said photographing optical system and an optical axis of said optically transparent film is fixed at 45°.

14. The image pickup apparatus according to claim 1, wherein the angle $\theta_m$ is set based on said pixel pitch and a thickness of said optically transparent film.

15. The image pickup apparatus according to claim 1, wherein the angle $\theta_m=0°$ and an angle $\theta_b$ formed between said optical axis of said photographing optical system and an optical axis of said optically transparent film is fixed at a value greater than 5°.

16. The image pickup apparatus according to claim 1, wherein a thickness of said optically transparent film is less than approximately 800 µm.

17. The image pickup apparatus according to claim 1, wherein a thickness of said optically transparent film is less than approximately 60 µm.

18. The image pickup apparatus according to claim 1, wherein an optical low pass filter is disposed between said optically transparent film and said image pickup surface.

19. The image pickup apparatus according to claim 18, wherein a phase resolving plate is disposed between and is attached to said optical low pass filter and said optically transparent film.

* * * * *